United States Patent
Li

(10) Patent No.: US 11,276,131 B2
(45) Date of Patent: Mar. 15, 2022

(54) PROPERTY MANAGEMENT SYSTEM UTILIZING A BLOCKCHAIN NETWORK

(71) Applicant: Advanced New Technologies Co., Ltd., George Town (KY)

(72) Inventor: Yanpeng Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/587,277

(22) Filed: Sep. 30, 2019

(65) Prior Publication Data

US 2020/0286194 A1 Sep. 10, 2020

Related U.S. Application Data

(63) Continuation of application No. PCT/CN2019/076877, filed on Mar. 4, 2019.

(51) Int. Cl.
*G06Q 50/16* (2012.01)
*G06K 19/06* (2006.01)
(Continued)

(52) U.S. Cl.
CPC ..... *G06Q 50/163* (2013.01); *G06K 19/06037* (2013.01); *G06Q 30/0645* (2013.01);
(Continued)

(58) Field of Classification Search
CPC ............. G06Q 50/163; G06Q 30/0645; G06Q 2220/00; G06K 19/06037; H04L 9/0637;
(Continued)

(56) References Cited

U.S. PATENT DOCUMENTS 8,872,917 B1 * 10/2014 Rozenboim ...... G08B 13/19669
  348/143
9,849,364 B2 * 12/2017 Tran ........................ H04L 67/12
(Continued)

FOREIGN PATENT DOCUMENTS

CN          108428168           8/2018
CN          108564692           9/2018
(Continued)

OTHER PUBLICATIONS

Records Keeper, archived on Feb. 9, 2017, available at: < https://web.archive.org/web/20170209195312/https://www.recordskeeper.co/> ("RecordsKeeper"), (Year: 2017).*

(Continued)

*Primary Examiner* — Sarah M Monfeldt
*Assistant Examiner* — Wenren Chen
(74) *Attorney, Agent, or Firm* — Fish & Richardson P.C.

(57) ABSTRACT

Disclosed herein are methods, systems, and apparatus, including computer programs encoded on computer storage media, for controlling access to a property based on smart contract execution. One of the methods includes receiving credential data for a first entity requesting access to a property; in response to receiving the credential data, requesting execution of a smart contract associated with the property by a blockchain network, wherein the smart contract includes instructions to check a current status of a relationship between the first entity and a second entity associated with the property based on the credential data; receiving an execution result of the smart contract from the blockchain network; determining that the first entity is authorized to access the property based at least in part on the execution result; and in response to determining that the first entity authorized to access the property, enabling the first entity to access to the property.

24 Claims, 7 Drawing Sheets

| (51) | Int. Cl. | |
|---|---|---|
| | *H04L 9/06* | (2006.01) |
| | *G06Q 30/06* | (2012.01) |
| | *H04L 9/32* | (2006.01) |

(52) U.S. Cl.
CPC .......... *H04L 9/0637* (2013.01); *H04L 9/0643* (2013.01); *H04L 9/3239* (2013.01); *G06Q 2220/00* (2013.01); *H04L 2209/38* (2013.01)

(58) Field of Classification Search
CPC .. H04L 9/0643; H04L 2209/38; H04L 9/3239
USPC ........................................................ 705/314
See application file for complete search history.

(56) References Cited

U.S. PATENT DOCUMENTS

| 2012/0144203 | A1* | 6/2012 | Albisu | G06F 21/35 |
| | | | | 713/184 |
| 2017/0372542 | A1* | 12/2017 | Romero | G07C 9/00896 |
| 2018/0139056 | A1 | 5/2018 | Imai et al. | |
| 2018/0191714 | A1 | 7/2018 | Jentzsch et al. | |
| 2018/0211339 | A1 | 7/2018 | Mowatt et al. | |
| 2018/0322597 | A1 | 11/2018 | Sher | |

FOREIGN PATENT DOCUMENTS

| CN | 108694654 | 10/2018 |
| CN | 108711207 | 10/2018 |
| CN | 108961006 | 12/2018 |
| CN | 109003376 | 12/2018 |
| CN | 109215204 | 1/2019 |
| CN | 109242634 | 1/2019 |
| JP | 3122710 | 6/2006 |
| JP | 2007280398 | 10/2007 |
| JP | 2008140224 | 6/2008 |
| JP | 2012043042 | 3/2012 |
| JP | 2016042334 | 3/2016 |
| JP | 2017207998 | 11/2017 |
| JP | 2018081464 | 5/2018 |
| JP | 2019008680 | 1/2019 |
| JP | 6469920 | 2/2019 |
| JP | 2019028995 | 2/2019 |
| TW | M574287 | 2/2019 |
| WO | WO 2017037911 | 3/2017 |
| WO | WO 2018232221 | 12/2018 |

OTHER PUBLICATIONS

Anadiotis, George, "How to Use Blockchain to Build a Database Solution," ZDNet.com [online], Mar. 2, 3017, available at: < https://www.zdnet.com/article/blockchains-in-the-database-world-what-for-and-how/ >, ("Anadiotis") (Year: 2017).*

Vaughan-Nichols, Steven, "Storj Introduces a Distributed Blockchain-Protected Cloud Storage Service," ZDNet.com [online], Feb. 23, 2017, available at: < https://www.zdnet.com/article/story-introduces-a-distributed-blockchain-protected-cloud-storage-service/ > ("Vaughan") (Year: 2017).*

Panarello A, Tapas N, Merlino G, Longo F, Puliafito A. Blockchain and IoT integration: a systematic survey. Sensors (Basel) Aug. 2018;18(8):2575. doi: 10.3390/s18082575. http://www.mdpi.com/resolver?pii=s18082575 .s18082575 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/076877, dated Nov. 28, 2019, 6 pages.

Extended European Search Report in European Patent Application No. 19725892.4, dated Feb. 27, 2020, 8 pages.

* cited by examiner

PROPERTY MANAGEMENT SYSTEM UTILIZING A BLOCKCHAIN NETWORK

CROSS-REFERENCE TO RELATED APPLICATIONS

This application is a continuation of PCT Application No. PCT/CN2019/076877, filed on Mar. 4, 2019, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain networks can be used to track and manage transactions between participating entities, for example, transactions related to a leasing agreement between a landlord and a tenant. Many leasing arrangements often involve a lack of trust between landlords, tenants and other entities, such as property management entities or real estate agents. This can be due to inefficiencies involved in the overall leasing process and differences in expectations of the participating entities. For example, landlords are often unable to verify tenant information prior to agreeing to lease property, which creates risks of property damage or other liabilities if the tenant does not comply with terms of a leasing agreement. As another example, prospective tenants are often unable to access property to lease without the landlord or agent being present, which limits their ability to effectively visit properties prior to making a leasing decision.

SUMMARY

Implementations of this specification include computer-implemented methods for using a blockchain network to manage various aspects of property leasing to establish a trust platform between prospective tenants and landlords.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Figure 1:
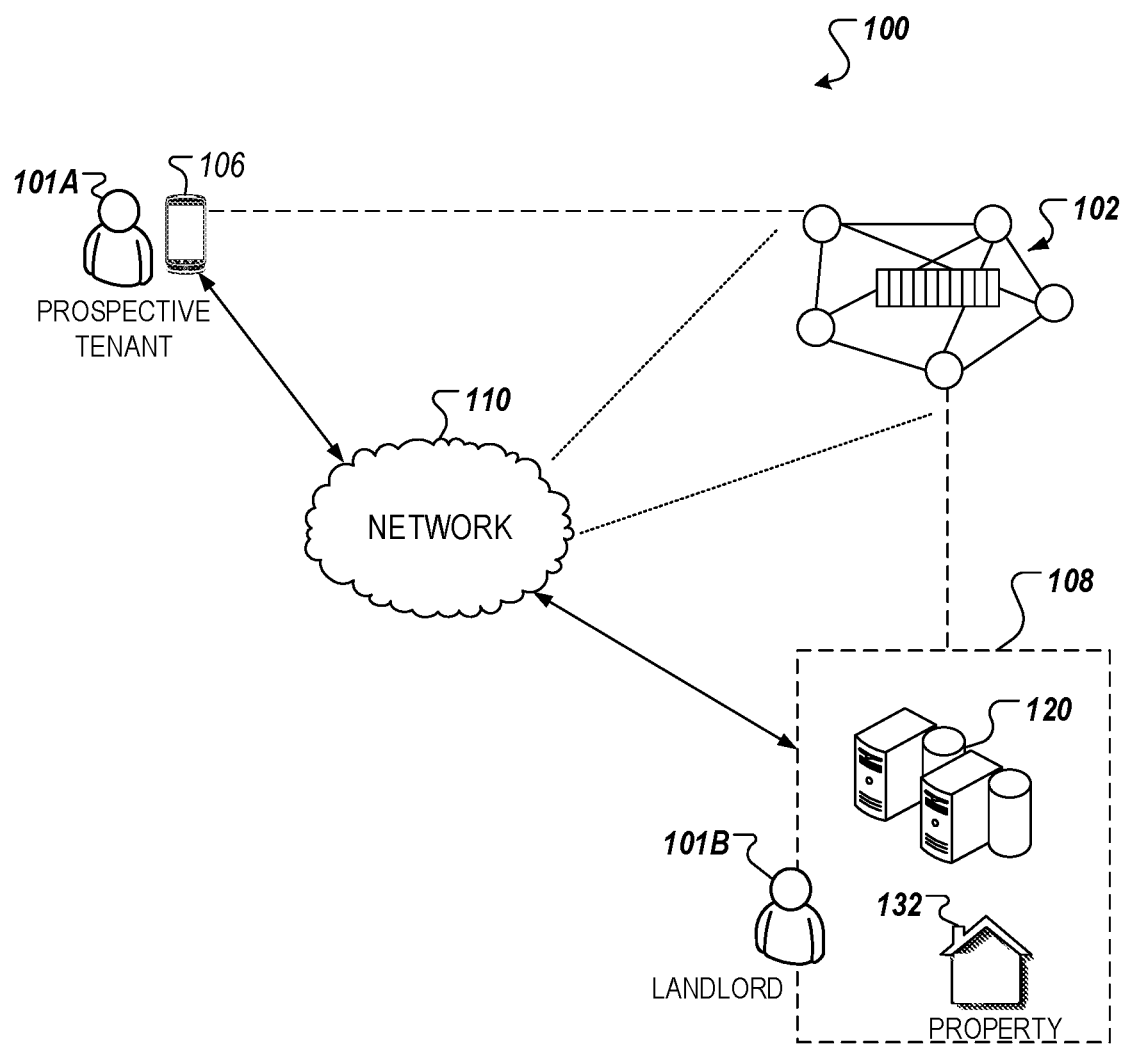
FIG. 1 depicts an example of an environment that can be used to execute implementations of this specification.

Implementations of this specification include computer-implemented methods for using a blockchain network to manage various aspects of property leasing to establish a trust platform between prospective tenants and landlords. More particularly, implementations of this specification are directed to using a blockchain network to establish a trust platform between a landlord and a prospective tenant to permit automated property visitation with minimal or no security risks to a property to be leased. In some implementations, the blockchain network can store a smart contact to facilitate the property leasing process and, once a property has been leased, record transactions related to the leased property (e.g., maintenance request records), rental payment records, disputes between landlord and tenant, among others. In some instances, transaction information stored in the blockchain network can further be used to generate and update reputation scores for landlords and tenants to reduce certain risks associated with property leasing. Although described herein in the context of leasing or rental agreements, the present techniques can also be applied mortgaged properties, sub-leased properties, or other types of property agreements.

In some implementations, actions include receiving, by a computing device, data indicating a credential for an entity requesting access to a property; determining, by the computing device, that the entity is authorized to access the property based at least in part on the credential; in response to determining that the entity authorized to access the property, enabling, by the computing device, the entity to access to the property; in response to enabling the entity to access the property, obtaining, by the computing device, sensor data collected by one or more sensors located in the property; generating, by the computing device, a representation of the sensor data; and storing, by the computing device, the representation in a blockchain maintained by a blockchain network.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with cryptocurrency networks, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. A consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of this specification are described in further detail herein with reference to a blockchain network, in which property transaction data (e.g., visitation information, rental information, maintenance service information) can be stored in a blockchain to increase trust between a landlord and tenant.

Implementations of this specification are described in further detail herein in view of the above context. More particularly, and as introduced above, implementations of this specification are directed to recording and managing property data in a blockchain network to increase trust between participating entities of a property rental.

FIG. 1 depicts an example of an environment 100 that can be used to execute implementations of this specification. In some examples, the environment 100 enables entities, such as a tenant 101A and a landlord 101B, to participate in a blockchain network 102. The blockchain network 102 can be used in various aspects of property leasing and management, such as property visitation, execution of leasing agreements, recordation of events relating to property leasing, as described throughout.

The environment 100 includes computing systems 106, 108 associated with a tenant 101A and a landlord 101B, respectively, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., the tenant 101A), such as lease management system that the first entity uses to manage its transactions relating to renting property with one or more other entities (e.g., landlords, real estate agents). The computing system 108 can host computer-implemented services of a second entity (e.g., the landlord 101B), such as a property management system that the second entity uses to manage its transactions related to a property 132 with one or more other entities (e.g., tenants, leasing agents, property management companies).

In the example of FIG. 1, the blockchain network 102 is represented as a peer-to-peer network of nodes, and the computing systems 106, 108 provide nodes of the first entity, and second entity respectively, which participate in the blockchain network 102. For example, the tenant 101A can participate in the blockchain network 102 to initiate a smart contract for leasing the property 132 with the landlord 101B. Thereafter, the blockchain network 102 can record transactions associated with the lease, which can be accessed and updated by the participating entities (e.g., the tenant 101A and the landlord 101B), or other entities.

Figure 2:
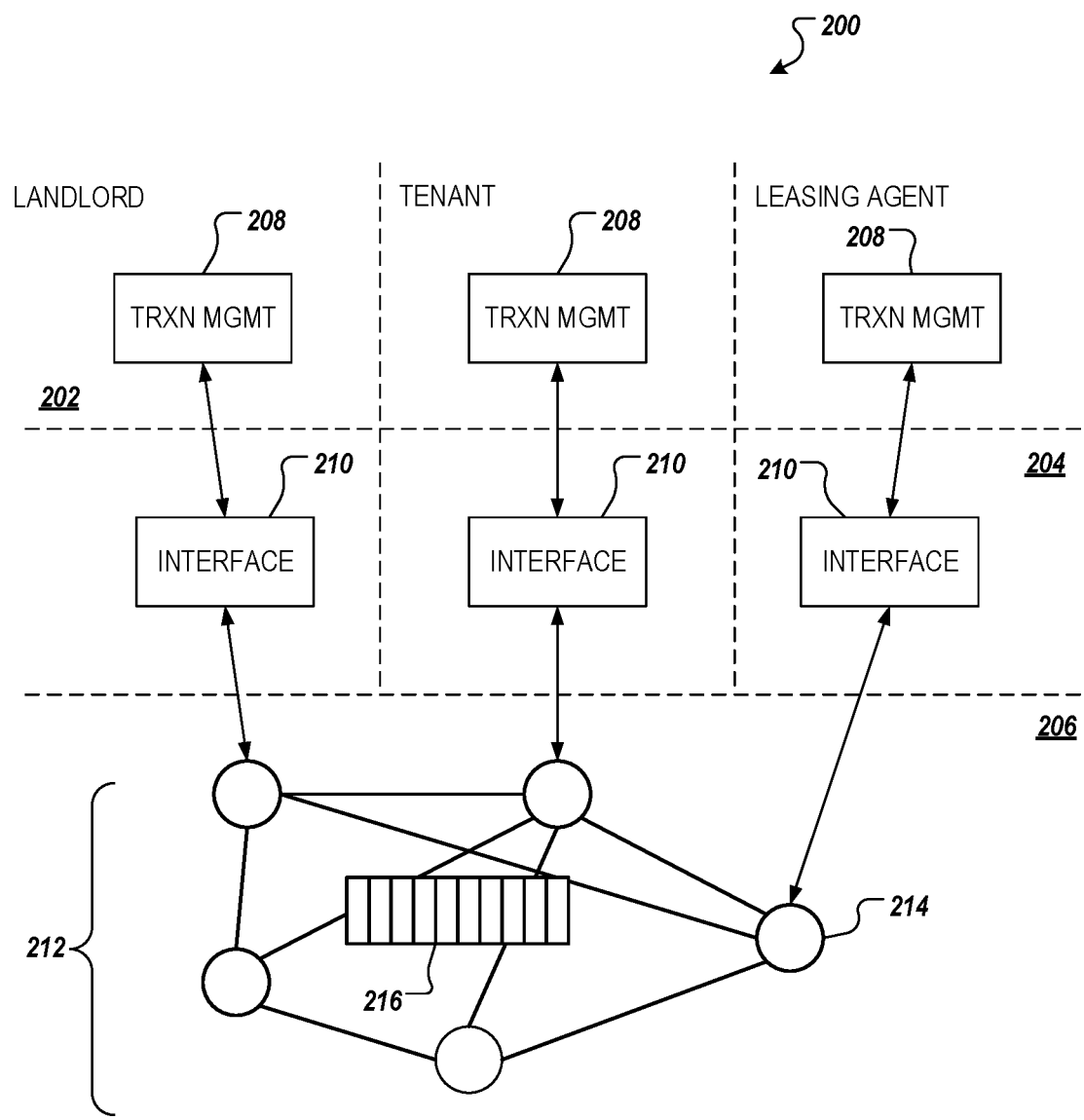
FIG. 2 depicts an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three entities, a landlord, a tenant, and a prospective tenant, each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the blockchain network.

Figure 3:
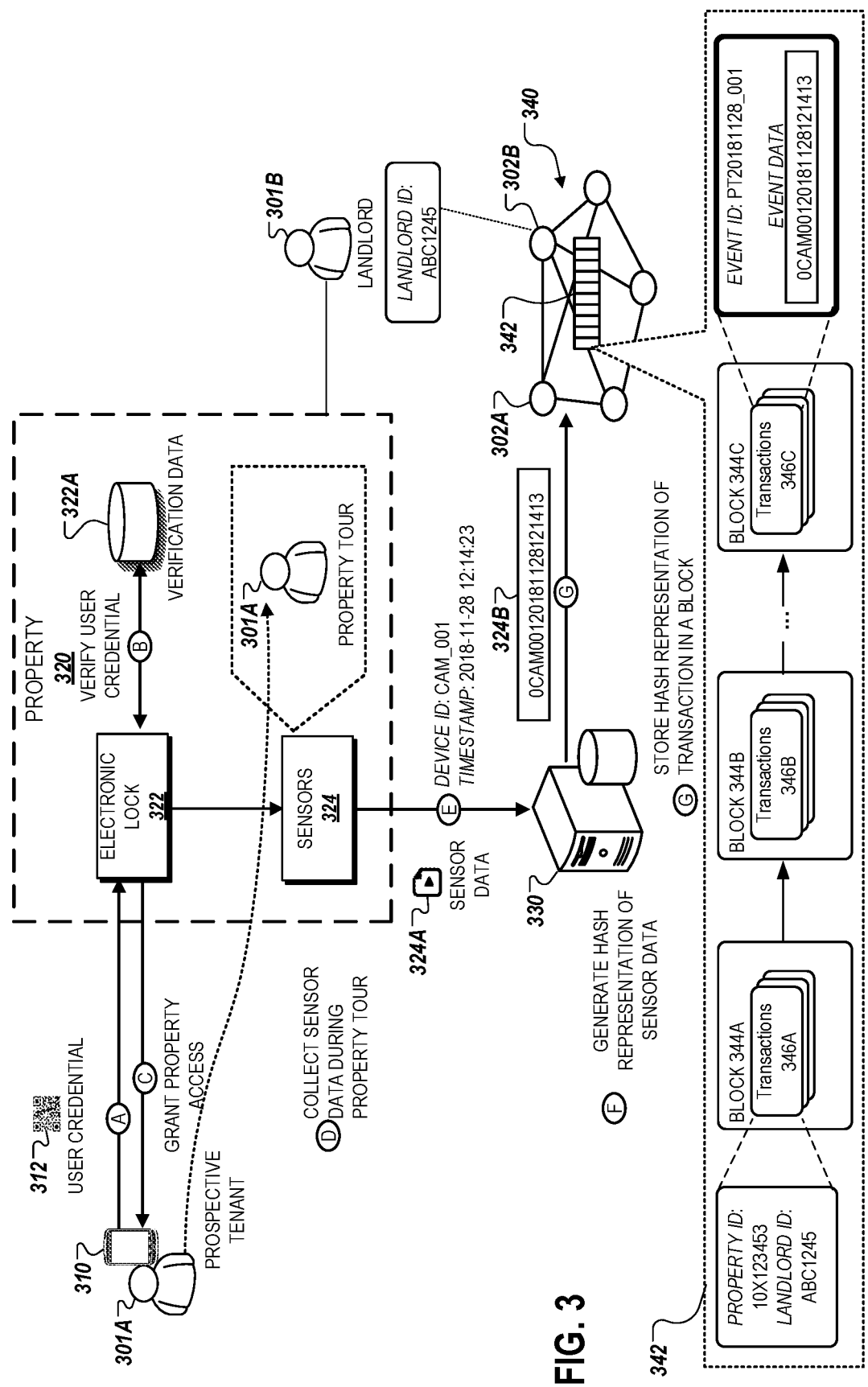
FIG. 3 illustrates an example of a technique for providing automated access to a property using a blockchain network.

FIG. 3 illustrates an example of a technique for providing automated access to a property using a blockchain network. In the example depicted, a user 301A can be provided with access to a property 320 for a property tour without requiring a landlord 301B or an agent to be physically present in the property 320 during the property tour. Data associated with the property tour can be collected by a computing system 330 and stored in a blockchain 342 within a blockchain network 340 for verification and evaluation.

Referring initially to the components depicted in FIG. 3, the electronic lock 322 may be a locking device that locks and unlocks an access point to the property 320, such as the front door. In some instances, the electronic lock 322 may be a stand-alone device with an electronic control assembly mounted directly to a lock. For example, the electronic lock 322 can be a control Z-Wave lock that uses wireless communications in the Z-Wave protocol to lock and unlock a door of the property 320. The electronic lock 322 may be configured to exchange data transmissions over a local area network within the property 320 with other devices that monitor the property 320, such as a control unit and an application server associated with a monitoring system of the property 320.

The electronic lock 322 may provide key control, access control, transaction logging and/or transaction logic based on the received credential data. In addition, the electronic lock 322 may be remotely monitored and controlled to lock and unlock the front door of the property 320 in response to credential data being received from the computing device 310.

The electronic lock 322 may use various locking mechanisms to lock and unlock the front door of the property by either supplying or removing power. In some instances, the electronic lock 322 may include a simple switch to temporarily provide access using a door release mechanism. In other instances, the electronic lock 322 may incorporate complex biometric-based access control systems. As examples, the electronic lock 322 may include at least one of an electromagnetic lock, electronic strikes, or electronic deadbolts and latches.

The electronic lock 322 can also be used as an authentication or validation device that prevents the likelihood of unauthorized access to the property 320. The electronic lock 322 can also include a scanning device that is used to verify a credential (e.g., a QR code) presented by the computing device 310, which is then compared to a verified code stored in verification data 322A. In some implementations, the electronic lock 322 can exchange data communications with a security camera that monitors the exterior of the property 320 to detect the presence of a user to verify that the user 301A is in fact an authorized to access the property 320.

The sensors 324 may include one or more of a contact sensor, a motion sensor, a glass break sensor, or any other type of sensor included in an alarm system or security system of the property 320. The sensors 324 also may include an environmental sensor, such as a temperature sensor, a water sensor, a rain sensor, a wind sensor, a light sensor, a smoke detector, a carbon monoxide detector, an air quality sensor, etc. The sensors 324 further may include a bed mat configured to sense presence of liquid (e.g., bodily fluids) on the bed mat, etc. In some examples, the sensors 324 may include a radio-frequency identification (RFID) sensor that identifies a particular article that includes a pre-assigned RFID tag.

The sensors 324 may also include one or more cameras. The cameras may be video/photographic cameras or other type of optical sensing devices configured to capture images. For instance, the cameras may be configured to capture images of an area within property 320. The cameras may be configured to capture single, static images of the area and also video images of the area in which multiple images of the area are captured at a relatively high frequency (e.g., thirty images per second). The cameras may be controlled based on commands received from the computing system 330.

Referring now the example of a technique depicted in FIG. 3, the technique proceeds in a set of steps for granting access to the property 320. At step (A), the tenant presents a credential 312 to obtain access to the property 320. For instance, the credential 312 can be a Quick Response (QR) code that is presented on the computing device 310 of the user 301A and processed by an electronic lock 322 of the property 320 using optical recognition techniques. The QR code can be distributed to an account of the user 301A by landlord 301B through, for example, a property leasing application that enables prospective tenants to view property listings and schedule property visits.

At step (B), the electronic lock 322 verifies the credential 312 based on verification data 322A. The verification can be used to confirm that the identity of the user that attempts to access the property 320 through the electronic lock 322 is the user identity that the landlord 301B has given permission to access the property 320. For example, the verification data 322A can store a verified credential that is associated with the landlord account, and the electronic lock 322 compares the credential 312 to the verified credential stored in the verification data 322A. If the credential 312 matches the verified credential, then the electronic lock 322 determines that the credential 312 is verified. Alternatively, if the credential 312 does not match the verified credential, then the electronic lock 322 determines that the credential 312 is not verified.

In some implementations, the credential 312 can be assigned a predetermined time period during which the credential 312 is valid. For example, the credential 312 can be valid for two days after it has been distributed to the computing device 310. The user 301A can use the credential 312 to access the property 320 during this time period, and after the time period has ended, then the credential 312 will expire so that the user 301A is no longer able to use the credential 312 to access the property 320.

At step (C), the electronic lock 322 grants access to the property 320 based on the determination that the credential 312 is valid. For example, the electronic lock 322 can be automatically unlocked so that the user 301A can enter the property 320 without requiring the landlord 301B or an authorized agent of the landlord 301B (e.g., a leasing agent) to be present at the property 320. In some implementations, the electronic lock 322 controls designated areas of the property 320 that the landlord 301B has authorized for access during a property tour. For example, the electronic lock 322 can provide access to common areas of the property 320, such as the living room, dining room, and kitchen, but restricts access to more private areas of the property 320, such as the bedrooms.

At step (D), the sensors 324 collect sensor data 324A during a property tour after the user 301A has been granted access to the property 320. For example, the sensors 324 can collect video data that represents movement of the user 301A throughout the property 320 during the property tour. In other examples, the sensors 324 can collect other types of sensor data, such as motion data, activity data, device usage data, among others. In some implementations, the sensors 324 can be configured to determine whether the user 301A has performed a restricted action during the property tour. For example, the sensors 324 can be configured to determine whether the user 301A has entered into a restricted area of the property 320 that has not been authorized for access by the landlord 301B. In such examples, the sensors 324 can be configured to perform actions in response to determining that a restricted action has been performed. For instance, the sensors 324 can provide an alert notification to a computing device of the landlord 301B, trigger an alarm condition at the property 320, among others.

At step (E), the sensor data 324A is provided to the computing system 330 for processing. The computing system 330 can be a server configured to provide monitoring services at the property 320 by exchanging electronic communications with the electronic lock 322, the sensors 324, and other connected devices at the property 320, such as a control unit or other Internet-of-things (IoT) devices present in the property 320.

The computing system 330 may be configured to monitor events (e.g., alarm events) generated at the property 320. For example, the computing system 330 may exchange electronic communications with a network module included in a control unit of the property 320 to receive information regarding events, such as the electronic lock 322 being unlocked prior to a property visit. The computing system 330 may store sensor data 324A received from the sensors 324 and perform analysis of sensor data 324A.

At step (F), the computing system 330 generates a hash representation 324B of the sensor data 324A. The hash representation 324B can uniquely identify the sensor data 324A and associated information, such as device identifiers for sensors that collected the sensor data 324A, timestamp information, among others. The hash representation 324B can be generated based on applying a hash function to information associated with the sensor data 324A, such as a device identifier of the sensors in the property 320, timestamp information, among other types of unique signature information. The hash representation 324B can be used to identify sensor data 324A stored at the computing system 330 and to verify that sensor data was actually collected by the sensors 324 during a property visit at the property 320.

At step (G), the computing system 330 stores the hash representation 324B in the blockchain 342 in association with the property 320. For example, the computing system 330 can store the hash representation 324B by generating and inserting a new transaction block 344C in the blockchain 342 for the property 320. The transaction block 344C can include transactions 346C representing information collected during the property visit by the user 301A at the property 320. For example, the transactions 346C can include an event identifier uniquely associated with the property visit, and the hash representation 324B for the sensor data 324A collected during the property visit. The blockchain 342 also includes a transaction block 344A specifying transactions 346A that are associated with identifiers for the property 320 and the landlord 301B. The blockchain 342 also includes a transaction blocks 344B that includes transactions 344B representing other prior property visits at the property 320.

Figure 4:
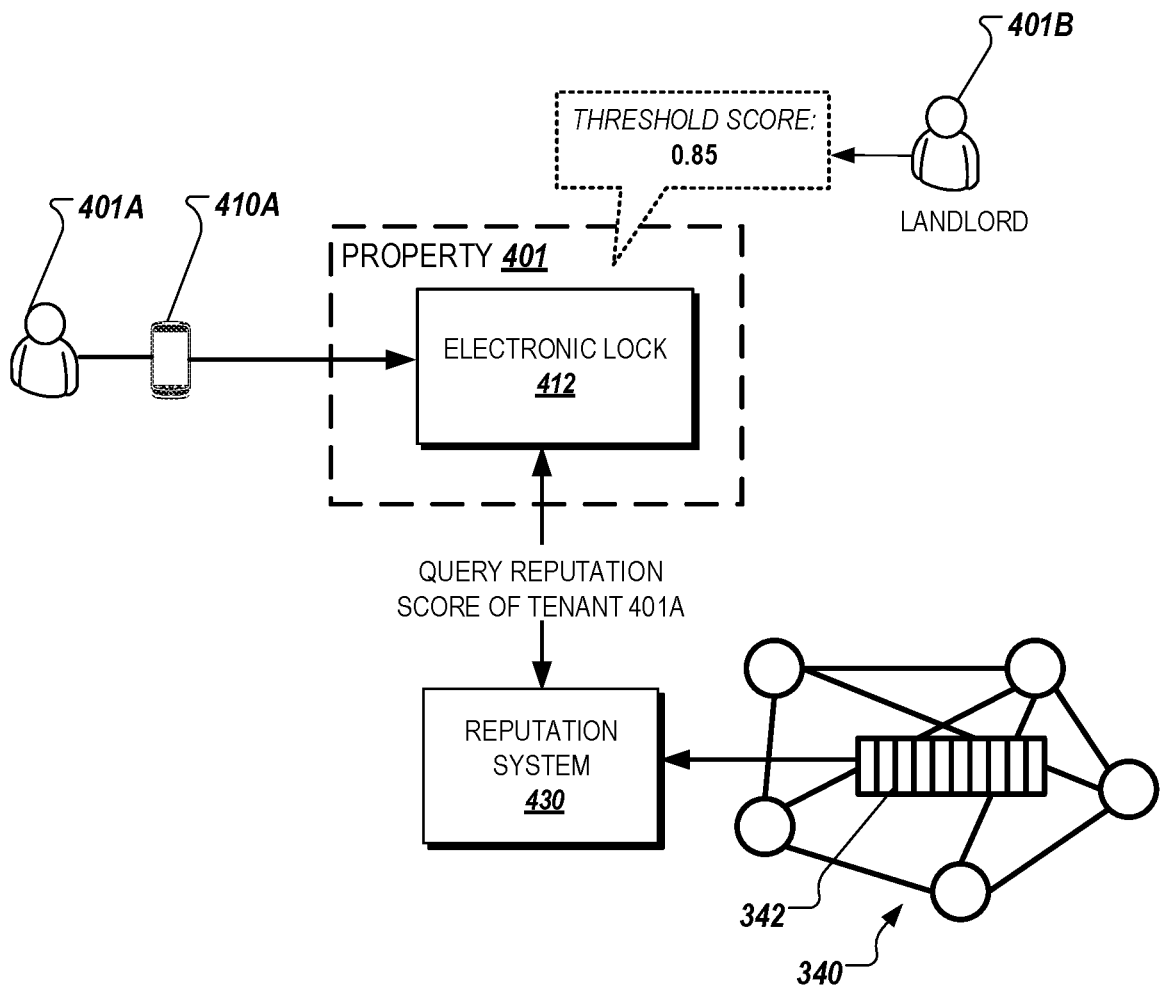
FIG. 4 illustrates an example of a technique for restricting automated access to a property using reputation scores stored in a blockchain network.

FIG. 4 illustrates an example of a technique for restricting automated access to a property 401 using reputation scores stored in a blockchain 410. In this example, the blockchain network 340 is associated with a reputation system 430 that exchanges data communications with an electronic lock 412 of a property 401. The reputation system 430 evaluates a reputation score of a user 401A when he/she attempts to access the property 401 using a computing device 410A in a similar manner as discussed above for FIG. 3. The reputation score of the user 401A can be generated by a separate system and stored in the blockchain network 340. The reputation system 430 can use the reputation score to control access to the property 401 by the user 401A. For example, a landlord 401B of the property 401 can specify a threshold score that is required to be provided with access to the property 401. In this example, the reputation system 430 queries the reputation score of the user 401A from the blockchain network 340 and evaluates the queried score in relation to the threshold specified by the landlord 401B to determine whether the user 401A should be granted access to the property 401. For instance, if the user 401A's reputation score is "0.90," then the reputation system 430 instructs the electronic lock 412 to grant the user 401A access to the property 401 since the value exceeds the threshold value of "0.85." Alternatively, if the user 401A's reputation score is "0.71," then the reputation system 430 instructs the electronic lock 412 to deny the user 401A access to the property 401 even if a credential presented by the user device 410A is valid since the value does not exceed the threshold value of "0.85."

In this example discussed above, a reputation score can represent an assessment of a user's ability to meet the obligations a tenant that agrees to rent the property 401. For instance, the reputation score can represent a credit score of a user based on credit usage, existing debt obligations, historical payment records, behavioral data, or other data. In some instances, the reputation score can represent historical renting activity, such as prior delinquent payments, prior property disputes, employment history, among other types of information that may be of interest to the landlord 401C. In some instances, the reputation score can be a cumulative score that is combined based on combining different types of assessments. For example, the reputation score can be a cumulative score representing a user's financial history as well as the user's rental history.

Figure 5:
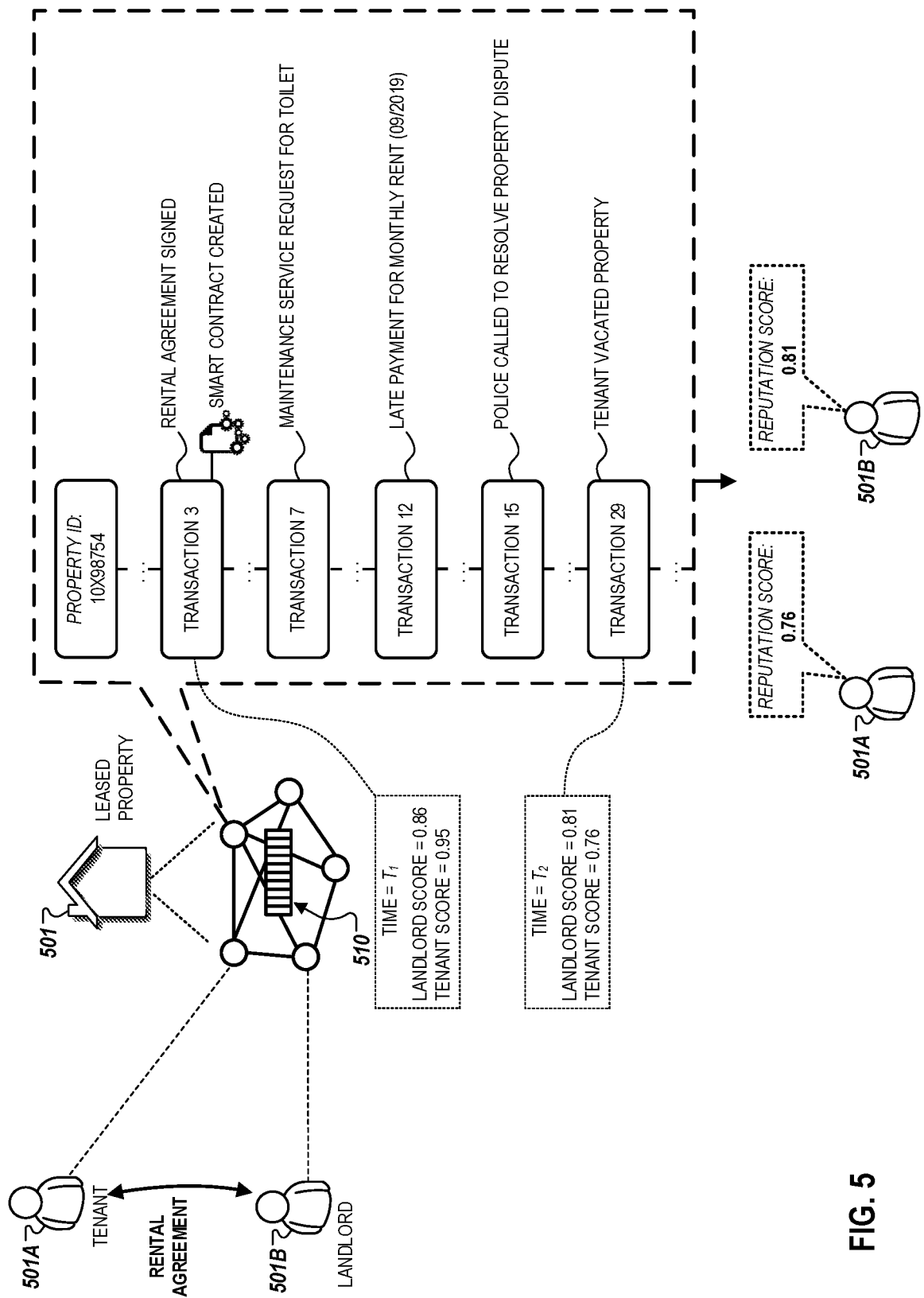
FIG. 5 illustrates an example of a technique for managing transactions related to a property lease using a blockchain network.

FIG. 5 illustrates an example of a technique for managing transactions related to a property lease using a blockchain 510. In the example depicted, the blockchain 510 includes blocks that include transactions related to rental agreements, including a rental agreement between a tenant 501A and a landlord 501B for a property 501. The blockchain 510 can store rental agreements for many different properties, and can be maintained by a network of blockchain nodes (not shown). In some cases, the blockchain 510 can include other types of transactions those related to rental agreements.

The blockchain 510 can store transactions that correspond to the tenant 501A or the landlord 501B. The transaction data stored in the blockchain 510 can be used to update metrics assigned to each participant in relation to a lease at the property 501. For example, the transaction data collected during a rental period can be used to adjust reputation scores assigned to the tenant 501A and landlord 501B after the rental period. In this regard, the blockchain 510 enables an external system, e.g., a reputation system, to monitor activity at the property 501 during a rental period so that the monitored activity can then be used to dynamically adjust metrics that represent a participating entity's activity during the rental period.

The metrics discussed above can include reputation scores assigned to the tenant and landlord, financial history scores assigned to the tenant and landlord, a number of service requests submitted by the tenant, an average time period for the landlord to provide repairs after receiving a service request, or other types of activity information that may be of interest to prospective tenants and/or prospective landlords after the rental period. For example, a landlord score may be of interest to a prospective tenant of the property 501 after the rental period if the transaction activity recorded in the blockchain 510 indicates that the landlord 501B has previously provided poor repair service. As another example, a tenant score for another tenant may be of interest to the landlord 501B after the rental period if the tenant's transaction activity indicates that the user has not previously received his security deposit, indicating a likelihood that the tenant will damage the property 501 during a subsequent rental period.

In the example depicted in FIG. 5, once a rental agreement has been formed between the tenant 501A and the landlord 501B, transaction information related to the agreement can be stored in the blockchain 510. For example, "TRANSACTION 3" includes transaction information indicating a date on which the rental agreement was executed by the tenant 501A and the landlord 501B and a smart contract associated with the rental agreement. As described herein, a smart contract can be a self-executing contract mirroring the terms of the rental agreement. The code is stored in the blockchain 510 and executed by nodes of the blockchain network maintaining blockchain 510 when called, for example by a smart lock controlling access to the property.

For example, the landlord 501B could create a smart contract that would accept a monthly rent payment from the tenant 501A, and would disable an electronic lock on the rental property if the rent was not received by a certain date. When stored in the blockchain, the smart contract will be associated with an address. The tenant 501A could be instructed to transfer rent payments to the address of the smart contract. When this rent payment transaction is stored in the blockchain, the smart contract would be triggered by the transaction including its address, and executed by the nodes of the blockchain network. The smart contract can update its internal state, which is also stored in the blockchain, to indicate that the tenant 501A has paid its rent for that particular month. In addition, the smart contract can include a function to provide an indication of whether tenant 501A is current on its rent based on its internal state. The electronic lock on the rental property can be configured to call this smart contract function when the tenant attempts to unlock the electronic lock. If the smart contract function indicates that the tenant 501A's rent is not current, the electronic lock can be configured to deny the tenant 501A access to the property. If the smart contract function indicates that the tenant 501A's rent is current, the electronic lock can be configured to allow the tenant 501A access to the property.

In another example, "TRANSACTION 7" includes transaction information identifying a maintenance service request for a broken toilet in the property 501 that is submitted by the tenant 501A. This block can also include other information associated with the maintenance service request, such as the timestamp associated with the landlord 501B to perform a repair operation, prior maintenance service requests submitted for the same toilet, or other incidents at the property 501, such as water damage or pipe leakage, that may be related to the maintenance service request.

The blockchain 510 can include transaction information that can be used to dynamically adjust metrics associated with each participating entity in the rental agreement. For example, "TRANSACTION 12" represents a late monthly rental payment by the tenant 501A and "TRANSACTION 15" represents a police report being filed for a dispute that arose at the property 501. The system uses this transaction information to compute adjustments to scores assigned to the tenant 501A and the landlord 501B during the rental agreement and/or after termination of the rental agreement. For example, the late rental payment identified for "TRANSACTION 12" can be used to reduce a tenant score from 0.95 at time $T_1$ (prior to late payment) to 0.76 at time $T_2$ (after the late payment). As another example, if the landlord takes an unreasonably long time to repair the toilet after receiving the maintenance service request identified in "TRANSACTION 7," then the landlord score can be reduced from 0.86 at time $T_1$ (prior to receiving the maintenance service request) to 0.81 at time $T_2$ (after a repair has been completed). In this regard, transaction information of the participating entities stored in the blockchain 510 during the rental period can be used to manage track their obligations under the rental agreement and adjust scores accordingly.

The blockchain 510 can also identify a time point when an existing rental agreement associated with the property 501 has terminated. For example, "TRANSACTION 29" identifies a time point $T_2$ that the tenant 501A vacates the property 501, which represents termination of the rental agreement. In other examples, the termination date can be identified based on a date specified by the smart contract, or other actions taken by the participating entities, such as an eviction action by the landlord 501B or a separately agreed upon termination date determined by the participating entities.

Upon termination at time point $T_2$, the reputation system can update the scores assigned to the tenant 501A and the landlord 501B. In the example depicted in FIG. 5, the system reduces the score assigned to the tenant 501A based on the late payment identified in "TRANSACTION 12" and reduces the score assigned to the landlord 501B based on a delay associated with repairing the toilet in response to receiving the maintenance service request in "TRANSACTION 7."

In some implementations, the smart contract stored in the blockchain 510 that represents the rental agreement cannot be deleted, as entries in the blockchain 510 can be immutable. In such a case, the smart contract can be configured with a termination date included in its code. The smart contract, when executed, can check the current date, and if the current date is after the termination, the smart contract can simply exit.

Figure 6:
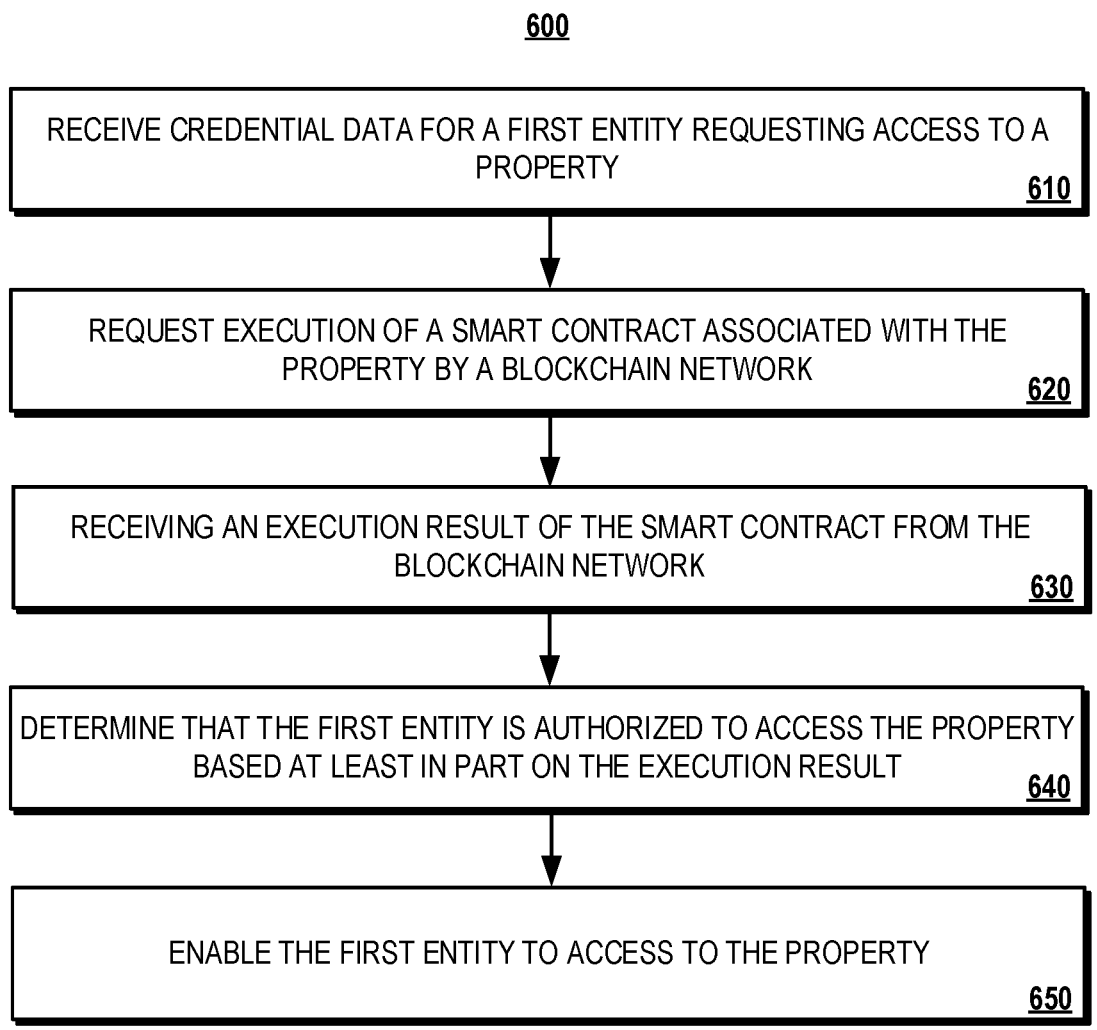
FIG. 6 depicts an example of a process that can be executed in accordance with implementations of this specification.

FIG. 6 depicts an example of a process 600 that can be executed in accordance with implementations of this specification. In some implementations, the process 600 may be performed using one or more computer-executable programs executed using one or more computing devices.

At 610, a system receives data indicating a credential for a first entity associated with a blockchain network. For example, the computing system 330 can receive data indicating the credential 312 associated for the user 301A. As discussed above in reference to FIG. 3, the credential 312 can be presented to the electronic lock 322 of the property 320 through the computing device 310. In some instances, the credential 312 is a QR code that is issued to the user 301A through an application used by the user 301A to access a rental listing for the property 320. The credential can be issued automatically (e.g., if a reputation score of the user 301A exceeds a threshold score specified by the landlord 301B as depicted in FIG. 4), or based on a confirmation provided by the landlord 301B.

At 620, the system determines that the credential is valid. For example, the computing system 330 and/or the electronic lock 322 of the property 320 can determine that the credential 312 is valid based on comparing the credential 312 to verification data 322A. As discussed above, the verification data 322A can include credentials distributed to prospective tenants that the landlord 301B indicated as having permission to access the property 320. In some instances, the electronic lock 322 and/or the computing system 330 determines that the credential 312 is valid based on identifying a matching credential in the verification data 322A. In some instances, the credential 312 can be processed in real-time, which causes a notification to be provided to a computing device of the landlord 310A. In such instances, the electronic lock 322 and/or the computing system 330 determines that the credential 312 is valid based on receiving a response from the landlord 301B that the user 301A should be granted access to the property 320.

At 630, the system enables access to a property. For example, the electronic lock 322 can be configured to unlock a front door so that the user 301A can enter property 320. As discussed above, the electronic lock 322 can provide access so that the user 301A can enter the property 320 without requiring that the landlord 301B and/or an agent of the landlord 301B to be present in the property 320 during the property visit.

At 640, the system obtains sensor data collected by one or more sensors located in the property after access to the property has been enabled. For example, the computing system 330 obtains sensor data 324A collected by the sensors 324 while the user 301A views the property 320 during a property tour after being provided access to the property 320 by the electronic lock 322. As discussed above, the sensor data 324A can include video data collected by a security camera, occupancy data identifying location of the property 320 that were visited, or other types of sensor data, such as activity data, motion data, among others.

At 650, the system generates a representation of the sensor data. For example, the computing system 330 generates a hash representation 324B of the sensor data 324A. In some implementations, the representation can be a hash representation that uniquely identifies the sensor data 324A and associated information, such as device identifiers for sensors that collected the sensor data 324A, timestamp information, among others. The hash representation can be generated based on applying a hash function to unique information associated with the sensor data 324A, such as a device identifier of the sensors in the property 320, timestamp information, among other types of unique signature information.

At 660, the system stores the representation in a blockchain maintained by a blockchain network (as shown in FIG. 3).

Figure 7:
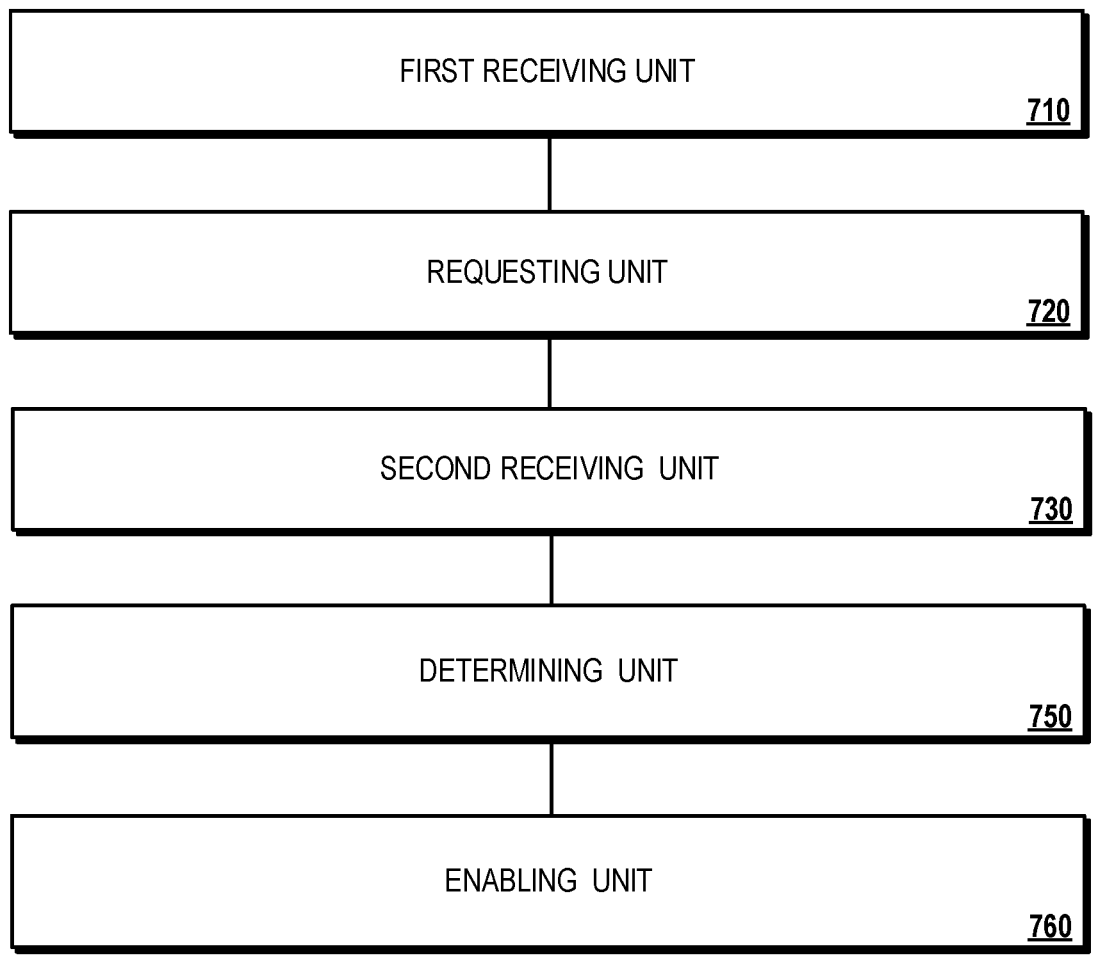
FIG. 7 depicts examples of modules of an apparatus in accordance with implementations of this specification.

FIG. 7 depicts examples of modules of an apparatus 700 in accordance with implementations of this specification. The apparatus 700 can be an example implementation of a software process configured to implement a method for validating property rental transactions. The apparatus 700 can correspond to the implementations described above, and the apparatus 700 includes the following: a first receiving unit 710 for receiving credential data for a first entity requesting access to a property; a requesting unit 720 for requesting execution of a smart contract associated with the property by a blockchain network in response to receiving the credential data, wherein the smart contract includes instructions to check a current status of a relationship between the first entity and a second entity associated with the property based on the credential data; a second receiving unit 730 for receiving an execution result of the smart contract from the blockchain network; a determining unit 740 for determining that the first entity is authorized to access the property based at least in part on the execution result; and an enabling unit 750 for enabling the first entity to access to the property in response to determining that the first entity authorized to access the property.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the implementations of the present application without creative efforts.

Referring again to FIG. 7, it can be interpreted as illustrating an internal functional module and a structure of a software process configured to implement a method for validating property rental transactions. An execution body in essence can be an electronic device, and the electronic device includes the following: one or more processors; and a memory storing an executable instruction of the one or more processors.

The techniques described in this specification produce one or more technical effects. For example, in some embodiments, the described techniques can enable a computer to retrieve data from an external data source (e.g., a blockchain) regarding the current standing of a tenant, and to control the operation of a physical access device (e.g., a smart lock) located at a property based on the current standing of the tenant. Because the data representing the current standing of the tenant is verified by the consensus process of the blockchain network, the physical access device will receive a status that is authentic and has not been tampered with. This enhances the security of the system, by preventing an attacker from tampering with the status to gain access to the property. In some embodiments, the described techniques can enable a computer to receive data from various electronic sensors located at a property, to process the sensor data to create a representation of the data for storage, and to store the representation of the sensor data in an external data store (e.g., a blockchain).

Described embodiments of the subject matter can include one or more features, alone or in combination. For example, in some embodiments, actions include receiving, by a computing device, credential data for a first entity requesting access to a property; in response to receiving the credential data, requesting, by the computing device, execution of a smart contract associated with the property by a blockchain network, wherein the smart contract includes instructions to check a current status of a relationship between the first entity and a second entity associated with the property based on the credential data; receiving, by the computing device, an execution result of the smart contract from the blockchain network; determining, by the computing device, that the first entity is authorized to access the property based at least in part on the execution result; and in response to determining that the first entity authorized to access the property, enabling, by the computing device, the first entity to access to the property.

The foregoing and other described embodiments can each, optionally, include one or more of the following features:

A first feature, combinable with any of the following features, specifies that the actions in response to enabling the first entity to access the property, obtaining, by the computing device, sensor data collected by one or more sensors located in the property; generating, by the computing device, a representation of the sensor data; and storing, by the computing device, the representation in a blockchain maintained by a blockchain network.

A second feature, combinable with any of the previous or following features, the representation of the sensor data comprises a hash value, and the hash value is generated based on a timestamp associated with collection of the sensor data and one or more device identifiers of the one or more sensors.

A third feature, combinable with any of the previous or following features, specifies that the credential data is encoded in a quick response (QR) code located at the property.

A fourth feature, combinable with any of the previous or following features, specifies that the credential data is encoded in a quick response (QR) code located at the property, and wherein the credential data is received by the computing device from a device of the first entity after the device scan the QR code.

A fifth feature, combinable with any of the previous or following features, specifies that the one or more sensors located in the property comprises a camera located in the property, and the sensor data comprises video data collected by the camera after access to the property has been enabled.

A sixth feature, combinable with any of the previous or following features, specifies that the actions include receiving, by the computing device, an indication that property has been leased to new tenant different than the first entity; and in response to receiving the indication that the property has been leased to the new tenant, updating, by the computing device, a configuration of the computing device to request execution of a new smart contract associated with the new tenant in response to receiving the credential data.

A seventh feature, combinable with any of the previous or following features, specifies that the computing device is an electronic lock controlling access to the property, wherein the first entity is a tenant of the property, and wherein the current status of the relationship represents whether the tenant is in compliance with a rental agreement associated with the property.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for controlling access to a property based on smart contract execution, the method comprising:
- receiving, by a computing device, credential data for a first entity requesting access to the property;
- in response to receiving the credential data, requesting, by the computing device, execution, by a blockchain network, of a smart contract between the first entity accessing the property and a second entity owning the property, wherein the smart contract includes instructions to check a current status of a relationship between the first entity accessing the property and the second entity owning the property based on the credential data;
- receiving, by the computing device from the blockchain network, an execution result of the smart contract between the first entity and the second entity;
- determining, by the computing device, that the first entity is authorized to access the property based at least in part on the execution result of the smart contract between the first entity and the second entity;
- in response to determining that the first entity is authorized to access the property, enabling, by the computing device, the first entity to access to the property and obtaining, by the computing device, sensor data collected by one or more sensors located on the property in response to the execution result of the smart contract between the first entity and the second entity;
- generating, by the computing device, a hash representation of the sensor data collected in response to the execution result of the smart contract between the first entity and the second entity, wherein the hash representation of the sensor data is generated based on one or more device identifiers of the one or more sensors on the property; and
- storing, by the computing device in a blockchain maintained by the blockchain network, the hash representation of the sensor data collected in response to the execution result of the smart contract between the first entity accessing the property and the second entity owning the property, wherein, before storing the hash representation, the blockchain network performs a consensus process controlled by an authorized set of nodes to validate the hash representation of the sensor data collected in response to the execution result of the smart contract.

2. The method of claim 1, wherein the hash representation of the sensor data comprises a hash value, and the hash value is generated based on a timestamp associated with collection of the sensor data.

3. The method of claim 1, wherein the credential data is encoded in a quick response (QR) code located at the property.

4. The method of claim 1, wherein the credential data is encoded in a quick response (QR) code located at the property, and wherein the credential data is received by the computing device from a device of the first entity after the device scans the QR code.

5. The method of claim 1, wherein the one or more sensors located in the property comprises a camera located in the property, and the sensor data comprises video data collected by the camera after access to the property has been enabled.

6. The method of claim 1, further comprising:
- receiving, by the computing device, an indication that the property has been leased to a new tenant different than the first entity; and
- in response to receiving the indication that the property has been leased to the new tenant, updating, by the computing device, a configuration of the computing device to request execution of a new smart contract associated with the new tenant in response to receiving the credential data.

7. The method of claim 1, wherein the computing device is an electronic lock controlling access to the property, wherein the first entity is a tenant of the property, and wherein the current status of the relationship represents whether the tenant is in compliance with a rental agreement associated with the property.

8. A non-transitory, computer-readable storage medium storing one or more instructions executable by a computer system to perform operations comprising:
- receiving, by a computing device, credential data for a first entity requesting access to a property;
- in response to receiving the credential data, requesting, by the computing device, execution, by a blockchain network, of a smart contract between the first entity accessing the property and a second entity owning the property, wherein the smart contract includes instructions to check a current status of a relationship between the first entity accessing the property and the second entity owning the property based on the credential data;
- receiving, by the computing device from the blockchain network, an execution result of the smart contract between the first entity and the second entity;
- determining, by the computing device, that the first entity is authorized to access the property based at least in part on the execution result of the smart contract between the first entity and the second entity;
- in response to determining that the first entity is authorized to access the property, enabling, by the computing device, the first entity to access to the property and obtaining, by the computing device, sensor data collected by one or more sensors located on the property in response to the execution result of the smart contract between the first entity and the second entity;
- generating, by the computing device, a hash representation of the sensor data collected in response to the execution result of the smart contract between the first entity and the second entity, wherein the hash representation of the sensor data is generated based on one or more device identifiers of the one or more sensors on the property; and
- storing, by the computing device in a blockchain maintained by the blockchain network, the hash representation of the sensor data collected in response to the execution result of the smart contract between the first entity accessing the property and the second entity owning the property, wherein, before storing the hash representation, the blockchain network performs a consensus process controlled by an authorized set of nodes to validate the hash representation of the sensor data collected in response to the execution result of the smart contract.

9. The non-transitory, computer-readable storage medium of claim 8, wherein the hash representation of the sensor data comprises a hash value, and the hash value is generated based on a timestamp associated with collection of the sensor data.

10. The non-transitory, computer-readable storage medium of claim 8, wherein the credential data is encoded in a quick response (QR) code located at the property.

11. The non-transitory, computer-readable storage medium of claim 8, wherein the credential data is encoded in a quick response (QR) code located at the property, and wherein the credential data is received from a device of the first entity after the device scans the QR code.

12. The non-transitory, computer-readable storage medium of claim 8, wherein the one or more sensors located in the property comprises a camera located in the property, and the sensor data comprises video data collected by the camera after access to the property has been enabled.

13. The non-transitory, computer-readable storage medium of claim 8, the operations further comprising:
    receiving an indication that the property has been leased to a new tenant different than the first entity; and
    in response to receiving the indication that the property has been leased to the new tenant, updating a configuration of the computing device to request execution of a new smart contract associated with the new tenant in response to receiving the credential data.

14. The non-transitory, computer-readable storage medium of claim 13, wherein the computing device is an electronic lock controlling access to the property, wherein the first entity is a tenant of the property, and wherein the current status of the relationship represents whether the tenant is in compliance with a rental agreement associated with the property.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    receiving, by a computing device, credential data for a first entity requesting access to a property;
    in response to receiving the credential data, requesting, by the computing device, execution, by a blockchain network, of a smart contract between the first entity accessing the property and a second entity owning the property, wherein the smart contract includes instructions to check a current status of a relationship between the first entity accessing the property and the second entity owning the property based on the credential data;
    receiving, by the computing device from the blockchain network, an execution result of the smart contract between the first entity and the second entity;
    determining, by the computing device, that the first entity is authorized to access the property based at least in part on the execution result of the smart contract between the first entity and the second entity;
    in response to determining that the first entity is authorized to access the property, enabling, by the computing device, the first entity to access to the property and obtaining, by the computing device, sensor data collected by one or more sensors located on the property in response to the execution result of the smart contract between the first entity and the second entity;
    generating, by the computing device, a hash representation of the sensor data collected in response to the execution result of the smart contract between the first entity and the second entity, wherein the hash representation of the sensor data is generated based on one or more device identifiers of the one or more sensors on the property; and
    storing, by the computing device in a blockchain maintained by the blockchain network, the hash representation of the sensor data collected in response to the execution result of the smart contract between the first entity accessing the property and the second entity owning the property, wherein, before storing the hash representation, the blockchain network performs a consensus process controlled by an authorized set of nodes to validate the hash representation of the sensor data collected in response to the execution result of the smart contract.

16. The system of claim 15, wherein the hash representation of the sensor data comprises a hash value, and the hash value is generated based on a timestamp associated with collection of the sensor data.

17. The system of claim 15, wherein the credential data is encoded in a quick response (QR) code located at the property.

18. The system of claim 15, wherein the credential data is encoded in a quick response (QR) code located at the property, and wherein the credential data is received from a device of the first entity after the device scans the QR code.

19. The system of claim 15, wherein the one or more sensors located in the property comprises a camera located in the property, and the sensor data comprises video data collected by the camera after access to the property has been enabled.

20. The system of claim 15, wherein the operations further comprise: receiving an indication that the property has been leased to a new tenant different than the first entity; and in response to receiving the indication that the property has been leased to the new tenant, updating a configuration of the computing device to request execution of a new smart contract associated with the new tenant in response to receiving the credential data.

21. The system of claim 20, wherein the computing device is an electronic lock controlling access to the property, wherein the first entity is a tenant of the property, and wherein the current status of the relationship represents whether the tenant is in compliance with a rental agreement associated with the property.

22. The method of claim 1, wherein after obtaining, by the computing device, the sensor data collected by one or more sensors located in the property in response to the execution result of the smart contract, the method further comprises:
    determining that the first entity has entered into a restricted area of the property; and
    in response to determining that the first entity has entered into the restricted area of the property, storing, in the blockchain, sensor data indicating that the first entity entered the restricted area of the property.

23. The non-transitory, computer-readable storage medium of claim 8, wherein after obtaining, by the computing device, the sensor data collected by one or more sensors located in the property in response to the execution result of the smart contract, the operations further comprise:
    determining that the first entity has entered into a restricted area of the property; and
    in response to determining that the first entity has entered into the restricted area of the property, storing, in the blockchain, sensor data indicating that the first entity entered the restricted area of the property.

24. The computer-implemented system of claim 15, wherein after obtaining, by the computing device, the sensor data collected by one or more sensors located in the property in response to the execution result of the smart contract, the operations further comprise:
    determining that the first entity has entered into a restricted area of the property; and
    in response to determining that the first entity has entered into the restricted area of the property, storing, in the blockchain, sensor data indicating that the first entity entered the restricted area of the property.

* * * * *